(12) United States Patent
Kobierecki et al.

(10) Patent No.: US 12,006,064 B2
(45) Date of Patent: Jun. 11, 2024

(54) MANUFACTURING METHOD OF A CONTROL SURFACE OF AN AIRCRAFT AND AIRCRAFT CONTROL SURFACE

(71) Applicant: Airbus Operations S.L.U., Getafe (ES)

(72) Inventors: Robert Kobierecki, Getafe (ES); David Martin Palomares, Getafe (ES); Alberto Balsa-Gonzalez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 0 days.

(21) Appl. No.: 17/991,947

(22) Filed: Nov. 22, 2022

(65) Prior Publication Data
US 2023/0159186 A1 May 25, 2023

(30) Foreign Application Priority Data
Nov. 24, 2021 (EP) .................................... 21383061

(51) Int. Cl.
*B64F 5/10* (2017.01)
*B64C 9/00* (2006.01)

(52) U.S. Cl.
CPC . *B64F 5/10* (2017.01); *B64C 9/00* (2013.01)

(58) Field of Classification Search
CPC ..................................... B64F 5/10; B64C 9/00
See application file for complete search history.

(56) References Cited

U.S. PATENT DOCUMENTS

| | | | | |
|---|---|---|---|---|
| 6,306,239 B1* | 10/2001 | Breuer | ....................... | B64F 5/10 156/245 |
| 9,017,510 B2* | 4/2015 | Hansen | ............. | B29C 66/73756 156/286 |
| 9,522,504 B2* | 12/2016 | Garcia Martin | ........ | B29C 70/38 |
| 10,252,822 B2* | 4/2019 | Conversano | ............... | B64C 3/26 |
| 10,329,009 B2* | 6/2019 | Foster | ........................ | B64C 3/26 |
| 10,449,749 B1* | 10/2019 | Calder | ....................... | B32B 5/12 |
| 10,597,141 B2* | 3/2020 | Kordel | ....................... | B64C 9/00 |
| 10,710,703 B2* | 7/2020 | Belik | ......................... | B64C 3/24 |
| 10,814,602 B2* | 10/2020 | Sundquist | ........... | B32B 38/1808 |
| 10,836,472 B2* | 11/2020 | Witte | ..................... | B64D 45/02 |
| 11,046,415 B1* | 6/2021 | Pankonien | ................ | B64C 9/02 |
| 11,548,615 B2* | 1/2023 | Topf | ........................... | B64C 1/00 |
| 2003/0146346 A1* | 8/2003 | Chapman, Jr. | ........... | B29C 65/56 244/123.3 |

(Continued)

FOREIGN PATENT DOCUMENTS

| | | |
|---|---|---|
| EP | 2851283 A1 | 3/2015 |
| EP | 2878435 A1 | 6/2015 |

OTHER PUBLICATIONS

European Search Report dated Apr. 12, 2022; priority document.

*Primary Examiner* — Lawrence Averick (74) *Attorney, Agent, or Firm* — Greer, Burns & Crain, Ltd.

(57) ABSTRACT

A manufacturing method of a control surface of an aircraft, the control surface including an upper skin, a lower skin, ribs joining the upper skin and the lower skin and located along a chordwise direction of the control surface. The manufacturing method includes the steps of providing a single composite preform comprising the upper skin, the lower skin and the ribs, and curing the single composite preform such that an integrated box comprising the upper skin, the lower skin and the ribs is formed.

12 Claims, 6 Drawing Sheets

(56) References Cited

U.S. PATENT DOCUMENTS

| | | | |
|---|---|---|---|
| 2004/0145080 A1* | 7/2004 | Tanaka | B29C 70/443 264/258 |
| 2013/0011605 A1* | 1/2013 | Miller | B64F 5/10 156/182 |
| 2013/0149164 A1* | 6/2013 | Hansen | B29C 65/5042 156/92 |
| 2014/0154458 A1 | 6/2014 | Zilberman et al. | |
| 2015/0144737 A1* | 5/2015 | Garcia Martin | B29C 70/38 244/123.14 |
| 2015/0343702 A1 | 12/2015 | Garcia Martin et al. | |
| 2016/0244143 A1* | 8/2016 | Foster | B64C 3/28 |
| 2017/0050723 A1* | 2/2017 | Witte | B64C 5/08 |
| 2017/0240299 A1* | 8/2017 | Conversano | B64C 3/26 |
| 2018/0072432 A1* | 3/2018 | Sundquist | B29C 70/342 |
| 2018/0186443 A1* | 7/2018 | Belik | B64C 3/36 |
| 2019/0300148 A1* | 10/2019 | Kordel | B64C 3/26 |
| 2019/0337261 A1* | 11/2019 | Calder | B32B 3/08 |
| 2021/0309345 A1* | 10/2021 | Topf | B64C 9/00 |

* cited by examiner

MANUFACTURING METHOD OF A CONTROL SURFACE OF AN AIRCRAFT AND AIRCRAFT CONTROL SURFACE

CROSS-REFERENCES TO RELATED APPLICATIONS

This application claims the benefit of the European patent application No. 21383061.5 filed on Nov. 24, 2021, the entire disclosures of which are incorporated herein by way of reference.

FIELD OF THE INVENTION

The present invention refers to a manufacturing method of a control surface of an aircraft and to the control surface manufactured according to the method.

BACKGROUND OF THE INVENTION

Control surfaces are the primary control systems of an aircraft to safely control the aircraft during flight. Known control surfaces are ailerons, flaps, elevators, rudders, etc.

A control surface has a front edge, i.e., the foremost edge of the control surface, and a rear edge which is located opposite to the front edge in the chordwise direction.

Control surfaces are located at the leading edge or trailing edge of the lifting surfaces of the aircraft. The lifting surfaces of an aircraft are the wings, the horizontal tail plane (HTP) or the vertical tail plane (VTP).

Known control surfaces comprise the following elements:
An upper skin. The upper skin is usually made by carbon fiber reinforce polymers (CFRP) panels or by sandwich panels.
A lower skin. As well as the upper skin it is made by carbon fiber reinforce polymers (CFRP) panels or by sandwich panels.
Ribs, which run along the control surface in a chordwise direction and that are made by carbon fiber reinforce polymers (CFRP).
A spar, located along a span direction of the control surface. The spar is located between the control surface and the central box of the lifting surface.
Fittings, which are metallic components for attaching the control surface to the lifting surface and/or for attaching the actuators of the control surface. Known control surfaces comprise hinge line fittings and actuator fittings.
Leading edge access panels, usually made by carbon fiber reinforce polymers (CFRP) panels or by sandwich panels.

SUMMARY OF THE INVENTION

It is an object of the invention a manufacturing method of a control surface of an aircraft.

According to the above, a control surface comprises:
an upper skin,
a lower skin, and
ribs located along the chordwise direction of the control surface and that join the upper skin and the lower skin.

The manufacturing method object of the invention comprises the steps of:
providing a single composite preform comprising the upper skin, the lower skin and the ribs, and
curing the single composite preform such that an integrated box comprising the upper skin, the lower skin and the ribs is formed.

A composite preform is an assembly of fiber composite layers that have been pre-shaped to the form of the desired product and bonded together using a binder resin. Composite preforms are placed in a mold as a single piece.

An integrated box is understood as a one-piece box manufactured in one-shot curing process so that the upper and lower skins and all ribs of the control surface form a single unitary body.

The above described method achieves a control surface and manufacturing process as much integrated as possible, reducing the number of parts, assemblies, costs and complexity of the control surface.

The invention provides the following advantages:
Achieving fully integrated parts, as previously stated.
Reduction of assembly times due to fewer components.
Enable automation of the manufacturing process.
Reduction of costs.
Improvement in service repairs as the elements are easy to replace.
Reduction of lead time.

In summary, an integrated control surface with most of the elements manufactured in carbon fiber reinforce polymers (CFRP) is achieved. It leads to a control surface which is corrosion and fatigue free, low cost, low weight and high strength.

It is also an object of the present invention a control surface of an aircraft, that comprises an integrated box comprising the upper skin, the lower skin and the ribs made from a cured single composite preform comprising the upper skin, the lower skin and the ribs.

BRIEF DESCRIPTION OF THE DRAWINGS

To complete the description and to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
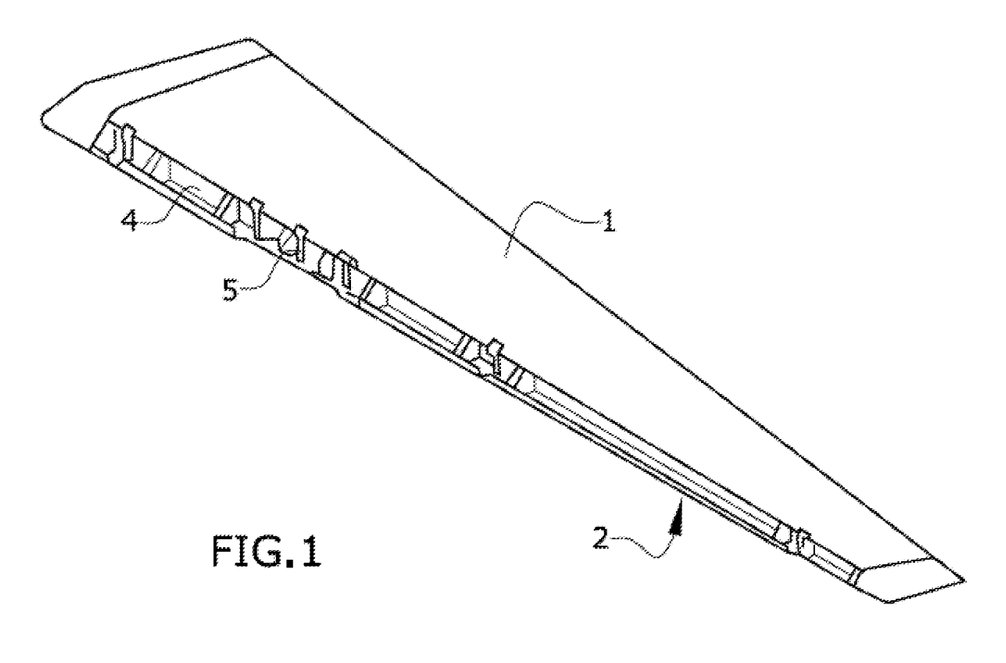
FIG. 1 shows a schematic perspective view of an embodiment of an aircraft control surface.

The embodiment of a control surface shown in FIG. 1 comprises:
an upper skin (1),
a lower skin (2), ribs (3), not shown, located in a chordwise direction of the control surface,
a spar (4) located in a span direction of the control surface at a front edge (8) or at a rear edge (9) of the control surface,
fittings (5) joined to the spar (4).

Figure 2:
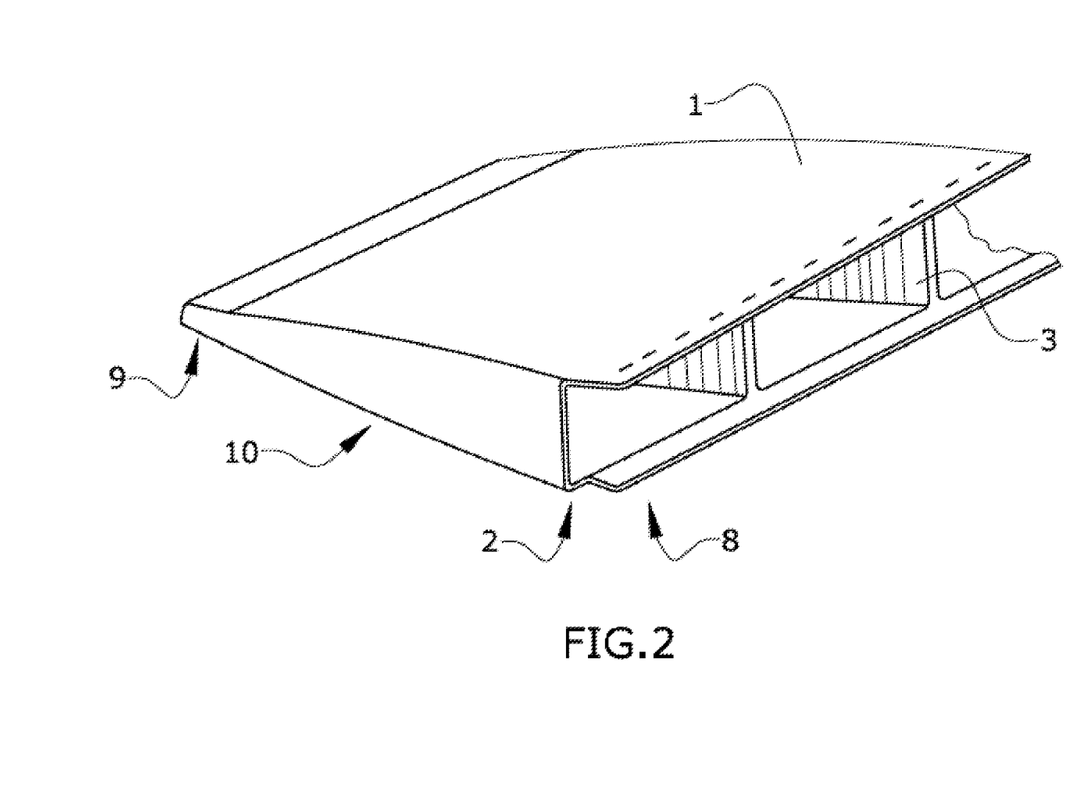
FIG. 2 shows a schematic perspective view of an embodiment of an integrated box of the control surface.

FIG. 2 discloses an embodiment of the integrated box (10) according to the method of the invention. It comprises the upper skin (1), the lower skin (2) and ribs (3) as a one-piece component.

FIG. 2 also discloses two arrows showing the extraction direction of a curing tool (12.1, 12.2), not represented on this figure, after the curing process. The curing tool (12.1, 12.2) is located between the upper skin (1) and the lower skin (2). After the curing process of the integrated box (10), the curing tool (12.1, 12.2) is extracted from the cured integrated box (10) in the chordwise direction towards the front edge (8) of the control surface.

Figure 5:
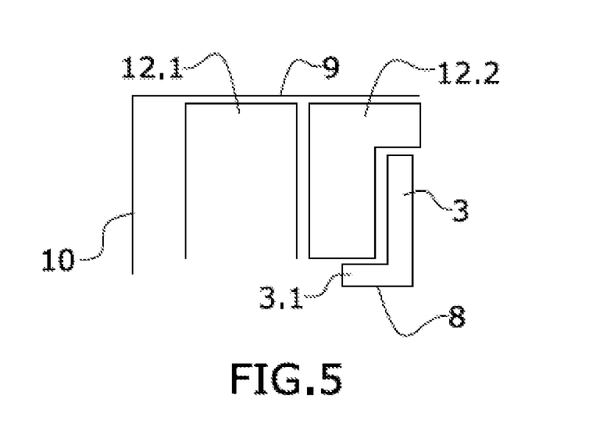
FIG. 5 shows a plan schematic representation of a cross-section of an embodiment of a portion of the integrated box and an embodiment of a curing tool.

In an embodiment, the curing tool (12) comprises a first part (12.1) in contact with the upper skin (1) and the lower skin (2), that may be wedge-shape, and a second part (12.2) having a L-shape, also with a wedge profile in a vertical section, in contact with the upper skin (1), the lower skin (2) and a rib (3). The portion of the second part (12.2) located in the chordwise direction is located in a space between the rib (3) and a rear edge (9) of the control surface as it is represented in FIG. 5.

The second part (12.2) having a L-shape simplifies the curing tool as it eases the removal of the piece compared with providing several smaller pieces adapted to the space between the rib (3) and a rear edge (9) that can move around and get lost during the curing process.

The first part (12.1) of the curing tool (12) can be removed through the front opening of the integrated box (10). The second part (12.2) may be slide left first to then be removed through the front opening of the integrated box (10).

In an embodiment, the manufacturing method object of the invention further comprises the step of providing a further single composite preform comprising the spar (4) and the fittings (5). The spar (4) is located along a span direction of the control surface at a front edge (8) or at a rear edge (9) of the control surface. In the embodiment shown in the figures, the spar (4) is located at the front edge (8). The method comprises the step of curing the single composite preform such that an integrated end (11) comprising the spar (4) and the fittings (5) is formed. Therefore, likewise, the entire spar area, including the hinge line fittings, is manufactured in one-shot by manufacturing the spar (4) and fittings (5) all together.

Figure 3:
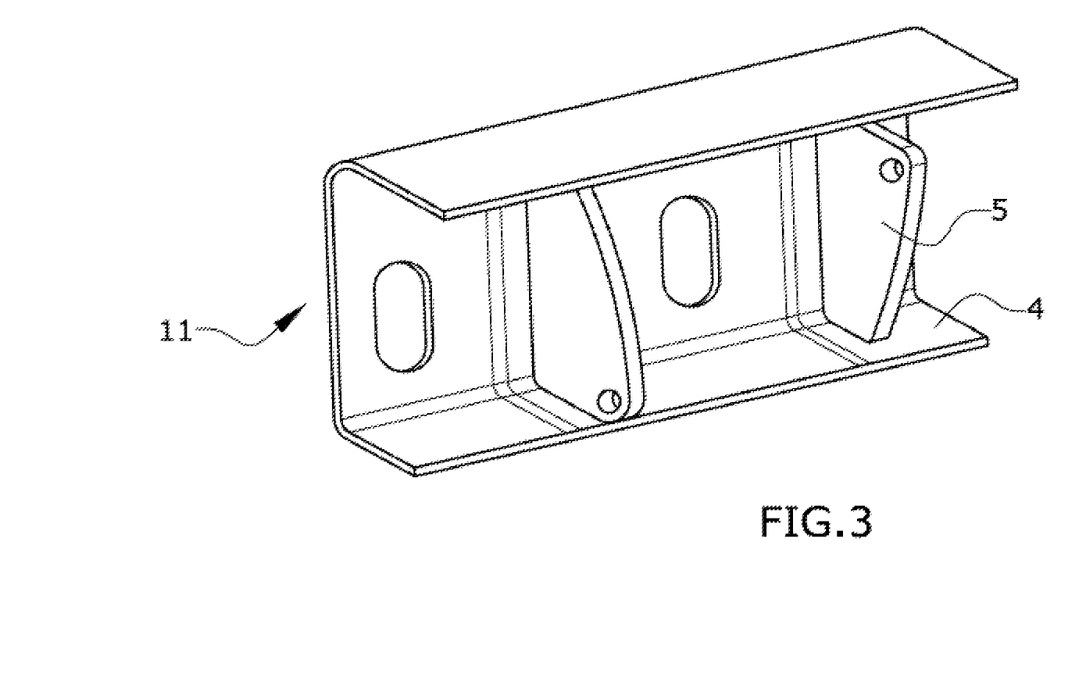
FIG. 3 shows a schematic perspective view of an embodiment of an integrated end of the control surface.

FIG. 3 discloses an embodiment of an integrated end (11) according to the claimed method. As stated, it comprises the spar (4) and the fittings (5) as a one-piece element.

Preferably, the preform of the upper skin (1), the lower skin (2) and the ribs (3) and the preform of the spar (4) and the fittings (5) are preforms in dry fiber state. Then the whole part is co-cured in the mold.

In an embodiment, the integrated box (10) and integrated end (11) are mechanically joined in a further step. Thus, both one-piece components are joined by mechanical means like fasteners, screws, pins, bolts, rivets, etc.

Figure 4:
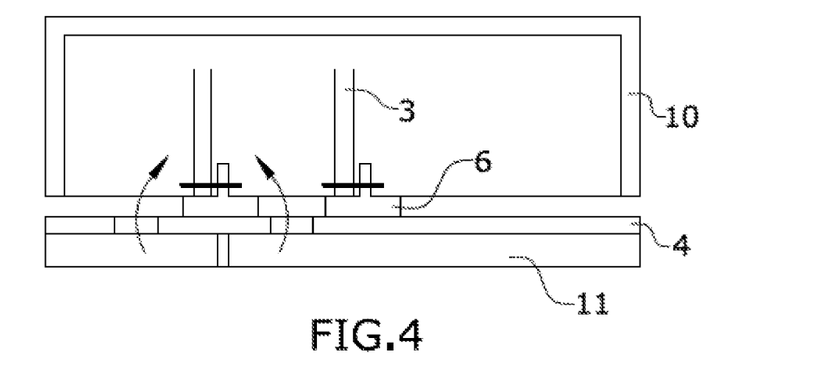
FIG. 4 shows a plan schematic representation of a cross-section of an embodiment of a portion of the integrated box and the integrated end and a T-shape mechanical joining element.

In the embodiment shown in FIG. 4, the integrated box (10) and the integrated end (11) are mechanically joined by providing a T-shape element (6), for instance metallic, located along the chord direction of the integrated box (10) which is joined to a rib (3) and to the spar (4) of the integrated end (11).

The T-shape element (6) may be rivetted to the ribs (3) and to the spar (4) ensuring loads transmission between the integrated end (11) and the integrated box (10) through the T-shape element (6).

In the shown embodiment, the web of the T-shape element (6) is joined to the rib (3) and the wings of the T-shape element (6) are located against the spar (4).

The T-shape elements (6) may be riveted to the ribs (3) before placing the integrated end (11). Alternatively, the spar (4) of the integrated end (11) may comprise openings for hands and/or tools so that the T-shape elements (6) may be attached or be a part of the spar (4) and then riveted to the ribs (3) once the integrated end (11) is in place.

In an alternative that may be also in combination with the above embodiment on the same control surface, at least a rib (3) comprises an extension (3.1) extending at least partially in the spanwise direction of the control surface at its front edge (8) or at its rear edge (9) such that the extension (3.1) is mechanically joined to the spar (4).

In an embodiment, ribs (3) are manufactured with its chordwise length shorter than the upper and lower skins (1, 2) chordwise length so that the ribs (3) do not reach the rear edge (9) of the control surface. It facilitates the assembly of the dry fiber elements in the narrow zone.

Figure 7:
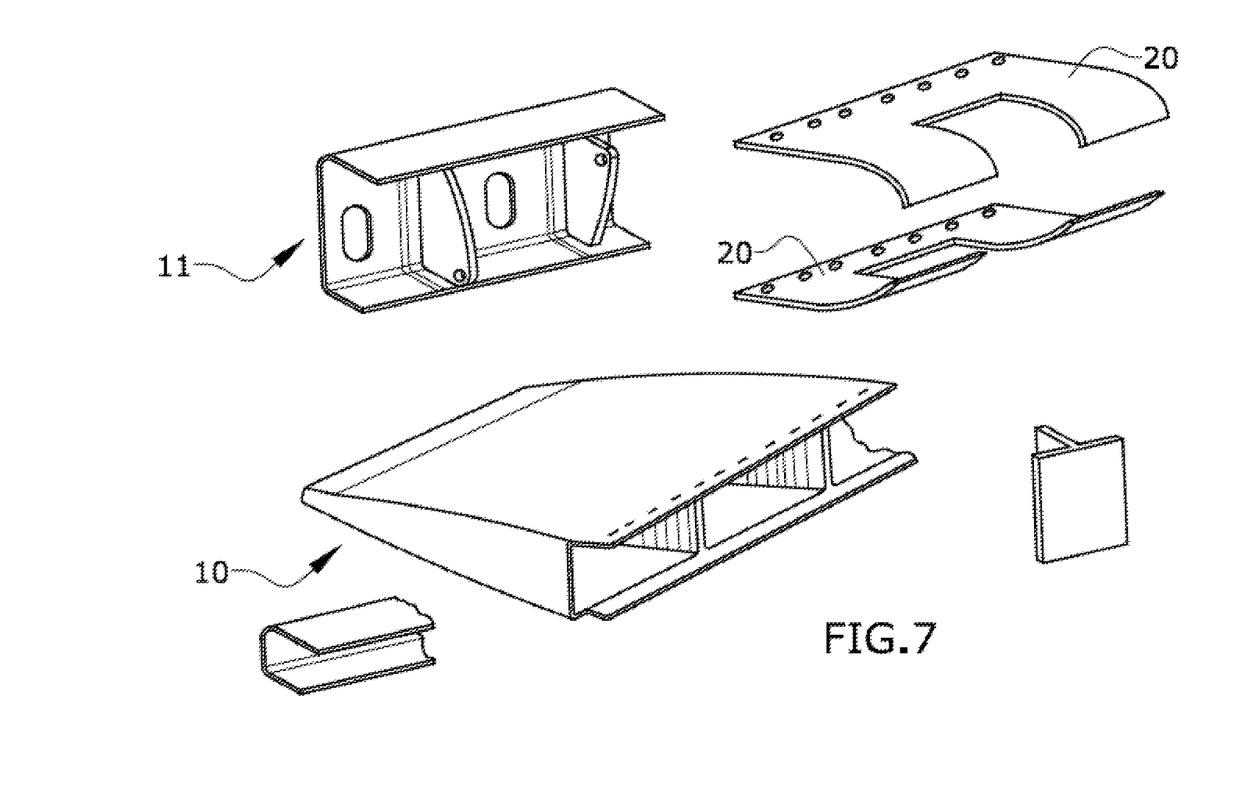
FIG. 7 shows a perspective exploded view of an embodiment of the integrated box the integrated end and of a panel of the control surface.

The control surface is finished installing at least a panel (20) covering the joint of the integrated box (10) and the integrated end (11) along the span direction of the control surface to form and close the joint aerodynamically. Additionally, they may have the function of being access panels (20) for repair/installation, etc. FIG. 7 shows a perspective exploded view of an embodiment of the integrated box (10), the integrated end (11) and of two panels (20) of the control surface.

Figure 6:
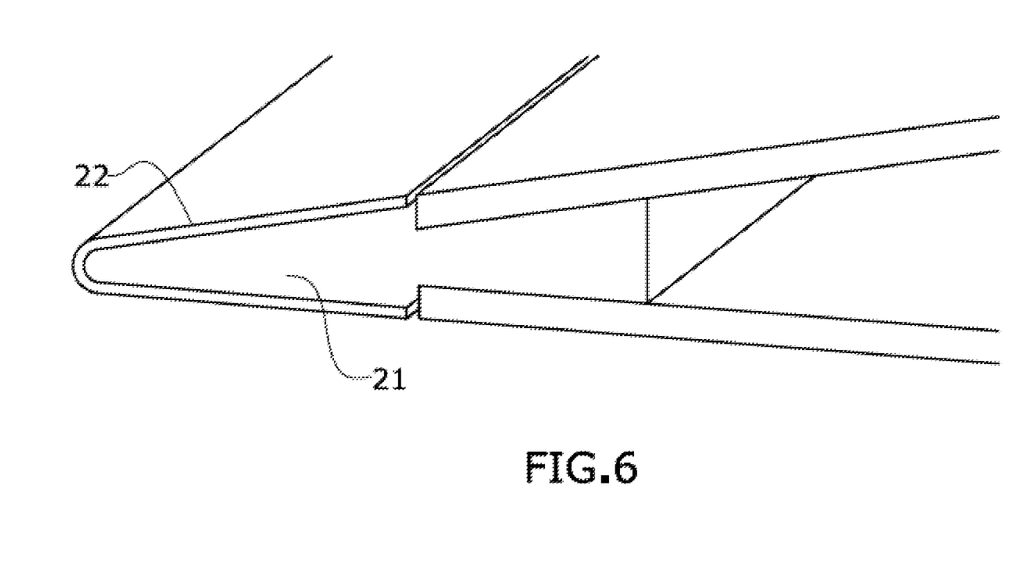
FIG. 6 shows a perspective view of an embodiment of the rear edge of the control surface.

The method may comprise the further step of providing a non-metallic insert (21) along the span direction of the control surface between the upper skin (1) and lower skin (2) at the rear edge (9) of the control surface. The non-metallic insert (21) is a simple way to end the trailing edge in a controlled manner, i.e., with a minimum tolerance.

The method may further comprise the step of providing a profile (22), metallic or non-metallic, covering the non-metallic insert (21) at the rear edge (9). FIG. 6 discloses an embodiment comprising the non-metallic insert (21) and the profile (22).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A manufacturing method of a control surface of an aircraft, the control surface comprising:
   an upper skin,
   a lower skin,
   ribs joining the upper skin and the lower skin and located along a chordwise direction of the control surface, wherein the manufacturing method comprises the steps of:
   providing a single composite preform comprising the upper skin, the lower skin and the ribs, and
   curing said single composite preform such that an integrated box comprising the upper skin, the lower skin and the ribs is formed,
wherein after the curing step of the integrated box, a curing tool located between the upper skin and the lower skin is extracted from the integrated box in a chordwise direction towards a front edge of the control surface,
wherein the ribs are manufactured with their chordwise length shorter than the upper and lower skins chordwise length, and
wherein the curing tool comprises a first part in contact with the upper skin and the lower skin and a second part having a L-shape in contact with the upper skin, the lower skin and a rib, a portion of the second part located in the chordwise direction being located in a space between the rib and a rear edge of the control surface.

2. The manufacturing method of a control surface of an aircraft, according to claim 1, the control surface further comprising:
   a spar located along a span direction of the control surface at a front edge or at a rear edge of the control surface,
   fittings joined to the spar, and
   wherein the manufacturing method further comprises
      providing a single composite preform comprising the spar and the fittings and curing said single composite preform such that an integrated end comprising the spar and the fittings is formed.

3. The manufacturing method of a control surface of an aircraft, according to claim 2, further comprising mechanically joining the integrated box and the integrated end of the control surface.

4. The manufacturing method of a control surface of an aircraft, according to claim 3, wherein the integrated box and the integrated end are mechanically joined providing at least a T-shape element located along a chord direction of the integrated box and joined to a rib of the integrated box and to the spar of the integrated end.

5. The manufacturing method of a control surface of an aircraft, according to claim 3, wherein at least a rib comprises an extension extending at least partially in a spanwise direction of the control surface at its front edge or at its rear edge such that the extension is mechanically joined to the spar.

6. The manufacturing method of a control surface of an aircraft, according to claim 2, wherein the composite preform of the upper skin, the lower skin and the ribs and the composite preform of the spar and the fittings are dry fiber composite preforms.

7. The manufacturing method of a control surface of an aircraft, according to claim 2, wherein the fittings are configured for attaching the control surface to at least one of a lifting surface of the aircraft or actuators of the control surface.

8. The manufacturing method of a control surface of an aircraft, according to claim 1, wherein the ribs are manufactured with their chordwise length shorter than the upper and lower skins chordwise length.

9. The manufacturing method of a control surface of an aircraft, according to claim 1, additionally comprising a step of providing at least a panel covering a joint of the integrated box and an integrated end along a span direction of the control surface.

10. The manufacturing method of a control surface of an aircraft, according to claim 9, further comprising a step of providing a non-metallic insert along the span direction of the control surface between the upper skin and lower skin at a rear edge of the control surface.

11. The manufacturing method of a control surface of an aircraft, according to claim 10, further comprising a step of providing a metallic profile along the span direction of the control surface and covering the non-metallic insert at the rear edge.

12. A manufacturing method of a control surface of 16. an aircraft, the control surface comprising:
   an upper skin,
   a lower skin,
   ribs joining the upper skin and the lower skin and located along a chordwise direction of the control surface,
   wherein the manufacturing method comprises the steps of:
      providing a single composite preform comprising the upper skin, the lower skin and the ribs, and
      curing said single composite preform such that an integrated box comprising the upper skin, the lower skin and the ribs is formed,
   wherein at least a panel covering a joint of the integrated box and an integrated end along a span direction of the control surface is provided,
   wherein a non-metallic insert is provided along the span direction of the control surface between the upper skin and lower skin at a rear edge of the control surface; and,
   wherein a metallic profile is provided along the span direction of the control surface and covering the non-metallic insert at the rear edge.

* * * * *